US012754700B2

(12) United States Patent
Nishikawa

(10) Patent No.: US 12,754,700 B2
(45) Date of Patent: Oct. 6, 2026

(54) INFORMATION PROCESSING APPARATUS, NON-TRANSITORY COMPUTER READABLE MEDIUM STORING PROGRAM, AND INFORMATION PROCESSING METHOD

(71) Applicant: FUJIFILM Business Innovation Corp., Tokyo (JP)

(72) Inventor: Masashi Nishikawa, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 0 days.

(21) Appl. No.: 18/189,213

(22) Filed: Mar. 24, 2023

(65) Prior Publication Data

US 2024/0069834 A1 Feb. 29, 2024

(30) Foreign Application Priority Data

Aug. 24, 2022 (JP) ................................ 2022-133642

(51) Int. Cl.
*G06F 3/12* (2006.01)

(52) U.S. Cl.
CPC ............ *G06F 3/126* (2013.01); *G06F 3/1205* (2013.01); *G06F 3/1288* (2013.01)

(58) Field of Classification Search
None
See application file for complete search history.

(56) References Cited

U.S. PATENT DOCUMENTS

| | | | | |
|---|---|---|---|---|
| 6,609,461 | B2 * | 8/2003 | Horii | G03G 15/5079 347/7 |
| 9,542,628 | B2 * | 1/2017 | Cheng | G06K 15/186 |
| 9,838,549 | B1 * | 12/2017 | Doi | H04N 1/00076 |
| 9,953,141 | B2 * | 4/2018 | Scott | G16H 10/40 |
| 2019/0294396 | A1 * | 9/2019 | Yuasa | G06F 3/1288 |
| 2020/0081663 | A1 * | 3/2020 | Matsui | G06F 3/1232 |
| 2022/0137889 | A1 * | 5/2022 | Akado | G06F 3/121 358/1.15 |

FOREIGN PATENT DOCUMENTS

| | | |
|---|---|---|
| JP | 2013003995 | 1/2013 |
| JP | 2015018518 | 1/2015 |
| JP | 2016057823 | 4/2016 |

OTHER PUBLICATIONS

"Notice of Reasons for Refusal of Japan Counterpart Application", issued on May 19, 2026, with English translation thereof, p. 1-p. 15.

* cited by examiner

*Primary Examiner* — Helen Zong
(74) *Attorney, Agent, or Firm* — JCIPRNET

(57) ABSTRACT

An information processing apparatus includes: a processor configured to: execute assignment of jobs to multiple printing devices such that sheet refilling timings of the multiple printing devices are shifted from each other.

12 Claims, 12 Drawing Sheets

FIG. 3

| AMOUNT OF REMAINING SHEETS<br>PRINTING DEVICE 1: 600 (SHEETS)<br>PRINTING DEVICE 2: 500 (SHEETS)<br>PRINTING DEVICE 3: 400 (SHEETS) | (PRINTING TIME PERIOD, AMOUNT OF USED SHEETS, PRINTING RATE) | | | | | | |
|---|---|---|---|---|---|---|---|
| | | JOB 1 | JOB 2 | JOB 3 | JOB 4 | JOB 5 | JOB 6 |
| PRINTING DEVICE | PRINTING DEVICE 1 | (10,400,40) | (5,200,40) | (3.33,100,30) | (10,300,30) | (15,300,20) | (20,400,20) |
| | PRINTING DEVICE 2 | (20,400,20) | (8,200,25) | (5,100,20) | (10,300,30) | (20,300,15) | (26.66,400,15) |
| | PRINTING DEVICE 3 | (26.67,400,15) | (10,200,20) | (4,100,25) | (15,300,20) | (20,300,15) | (40,400,10) |

FIG. 6

STATE 0

| | JOB 1 | JOB 2 | JOB 3 | JOB 4 | JOB 5 | JOB 6 |
|---|---|---|---|---|---|---|
| PRINTING DEVICE 1 | - | - | - | - | - | - |
| PRINTING DEVICE 2 | - | - | - | - | - | - |
| PRINTING DEVICE 3 | 26.67 | - | - | - | - | 40 |

FIG. 7

STATE 1

| | JOB 1 | JOB 2 | JOB 3 | JOB 4 | JOB 5 | JOB 6 |
|---|---|---|---|---|---|---|
| PRINTING DEVICE 1 | COMPLETED | 5 | - | 3.33 | 5 | 10 |
| PRINTING DEVICE 2 | COMPLETED | - | - | - | - | - |
| PRINTING DEVICE 3 | COMPLETED | - | - | - | - | 40 |

FIG. 8

STATE 2

| | JOB 1 | JOB 2 | JOB 3 | JOB 4 | JOB 5 | JOB 6 |
|---|---|---|---|---|---|---|
| PRINTING DEVICE 1 | COMPLETED | 5 | - | COMPLETED | 5 | 10 |
| PRINTING DEVICE 2 | COMPLETED | 8 | - | COMPLETED | 13.33 | 13.33 |
| PRINTING DEVICE 3 | COMPLETED | - | - | COMPLETED | - | 40 |

FIG. 9

STATE 3

| | JOB 1 | JOB 2 | JOB 3 | JOB 4 | JOB 5 | JOB 6 |
|---|---|---|---|---|---|---|
| PRINTING DEVICE 1 | COMPLETED | 5 | COMPLETED | COMPLETED | 5 | 10 |
| PRINTING DEVICE 2 | COMPLETED | 8 | COMPLETED | COMPLETED | 13.33 | 13.33 |
| PRINTING DEVICE 3 | COMPLETED | - | COMPLETED | COMPLETED | 20 | 30 |

FIG. 11

STATE 2

| | JOB 1 | JOB 2 | JOB 3 | JOB 4 | JOB 5 | JOB 6 |
|---|---|---|---|---|---|---|
| PRINTING DEVICE 1 | COMPLETED | 5 | - | 3.33 | 5 | COMPLETED |
| PRINTING DEVICE 2 | COMPLETED | 4 | 5 | 3.33 | 6.66 | COMPLETED |
| PRINTING DEVICE 3 | COMPLETED | - | - | - | - | COMPLETED |

FIG. 12

STATE 3

| | JOB 1 | JOB 2 | JOB 3 | JOB 4 | JOB 5 | JOB 6 |
|---|---|---|---|---|---|---|
| PRINTING DEVICE 1 | COMPLETED | 5 | - | COMPLETED | 5 | COMPLETED |
| PRINTING DEVICE 2 | COMPLETED | 4 | 5 | COMPLETED | 6.66 | COMPLETED |
| PRINTING DEVICE 3 | COMPLETED | 5 | 4 | COMPLETED | 6.66 | COMPLETED |

INFORMATION PROCESSING APPARATUS, NON-TRANSITORY COMPUTER READABLE MEDIUM STORING PROGRAM, AND INFORMATION PROCESSING METHOD

CROSS-REFERENCE TO RELATED APPLICATIONS

This application is based on and claims priority under 35 USC 119 from Japanese Patent Application No. 2022-133642 filed Aug. 24, 2022.

BACKGROUND

(i) Technical Field

The present invention relates to an information processing apparatus, a non-transitory computer readable medium storing a program, and an information processing method.

(ii) Related Art

JP2013-3995A discloses a method of determining sheet refilling timing for a printing device in a case where a plurality of printing devices are operated.

JP2013-3995A discloses a method of determining a recommended timing of sheet replenishment on the basis of a printing speed and an amount of remaining sheets. In one method, first, the printing speed and the amount of remaining sheets of all the printers are obtained. Next, for all the printers, a time T1 at which the sheet run-out occurs in at least one sheet refilling tray is obtained. Further, for at least one printer, a time T2 at which the sheet run-out occurs in all the sheet refilling trays is obtained. Then, in a case where T1<T2, T1 is determined as a recommended sheet replenishment time. Further, in a case where T2≤T1, a sheet run-out time that arrives earlier than T2 and the latest sheet run-out time is set as T3, and the recommended sheet replenishment time is determined. JP2013-3995A describes that sheet run-out in all the sheet refilling trays of a certain printer and interruption of the printing operation of the printer are avoided or suppressed using the method.

SUMMARY

In a case where sheets of a printing device run out while a worker refills a paper to another printing device, the worker is unable to refill the sheets to the former printing device until the sheet refilling of the latter printing device is completed. For the reason, the sheeting of the latter printing device is delayed by an amount of waiting for the completion of the sheet refilling of the former printing device, and the non-operating time period of the latter printing device increases.

Aspects of non-limiting embodiments of the present disclosure relate to an information processing apparatus, a non-transitory computer readable medium storing a program, and an information processing method that prevent a situation in which sheet refilling of a printing device delays sheet refilling of another printing device.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to: execute assignment of jobs to a plurality of printing devices such that sheet refilling timings of the plurality of printing devices are shifted from each other.

BRIEF DESCRIPTION OF THE DRAWINGS

Exemplary embodiment(s) of the present invention will be described in detail based on the following figures, wherein:

FIG. 3 is a diagram showing a specific example of information on a printing device and a job which is obtained by the printing control device;

FIG. 6 is a diagram showing an example of an initial state of a matrix for determination in a specific example in the procedure of FIG. 5;

FIG. 7 is a diagram showing an example of a subsequent state of the matrix for determination;

FIG. 8 is a diagram showing an example of the subsequent state of the matrix for determination;

FIG. 9 is a diagram showing an example of the subsequent state of the matrix for determination;

FIG. 11 is a diagram showing an example of a certain time point state of the matrix for determination in the procedure of FIG. 10;

FIG. 12 is a diagram showing an example of the subsequent state of the matrix for determination in the procedure of FIG. 10;

DETAILED DESCRIPTION

Figure 1:
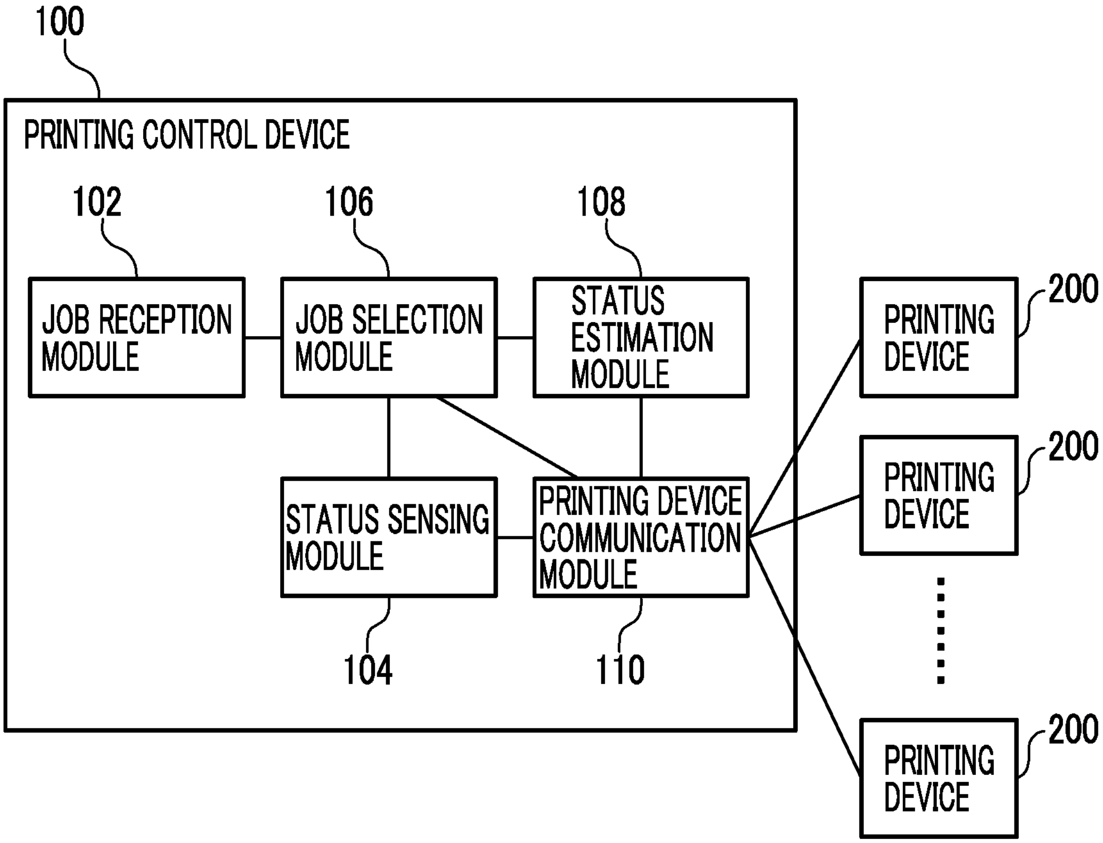
FIG. 1 is a diagram showing an example of a functional configuration of a printing control device of an exemplary embodiment.

Referring to FIG. 1, a functional configuration of the printing control device 100, which is an exemplary embodiment of the information processing apparatus according to the exemplary embodiment of the present invention, will be described.

The printing control device 100 is connected to a plurality of printing devices 200, and executes printing by controlling the plurality of printing devices 200. The printing control device 100 assigns a printing job received from a user to any of the plurality of printing devices 200 and executes the printing job. The printing job is a unit of a printing processing executed by the printing device, and includes printing data in which an image of a document to be printed is described in a page description language or the like. Hereinafter, the printing job is simply referred to as a job.

Although not shown, each user is able to access the printing control device 100 from his/her terminal through a network such as a local area network. The user registers the job in the printing control device 100, for example, through the network.

The printing control device 100 includes a job reception module 102, a status sensing module 104, a job selection module 106, a status estimation module 108, and a printing device communication module 110.

The job reception module 102 receives registration of the job from the user. For example, the job reception module 102 receives the job from a computer operated by the user through the network such as the local area network. Further, the job reception module 102 may receive designation of a file of a job for printing target from a group of files stored in a storage medium (for example, an optical disk or a flash memory) input to the storage medium reading device included in the printing control device 100.

The status sensing module 104 senses a status of each printing device 200 through the printing device communication module 110. The status sensed by the status sensing module 104 is, for example, an amount of remaining sheets in the sheet refilling unit of the printing device 200.

The job selection module 106 selects the job to be executed by each printing device 200. The processing, which is performed by the job selection module 106, will be described in detail later.

The status estimation module 108 estimates by calculation how the status of each printing device 200 changes in accordance with the selection of the job assigned to each printing device 200 by the job selection module 106. For example, the status estimation module 108 calculates how the amount of remaining sheets in each printing device 200 changes in accordance with the job assigned by the job selection module 106.

The printing device communication module 110 performs data communication with each printing device 200 through, for example, the network. The printing device communication module 110 executes, for example, communication in a case where the status sensing module 104 senses a status of each printing device 200 or communication for passing the job data to each printing device 200 in accordance with assignment of a finally determined job.

Next, an example of a procedure of processing executed by the printing control device 100 will be described with reference to FIG. 2. In the example, first, the job reception module 102 receives registration of a job from a user (S10). Accordingly, job data is stored in a storage device of the printing control device 100. In the example, a plurality of jobs are received by the job reception module 102 in S10, and then the processing proceeds to processing in and after S12. A trigger to proceed to processing in and after S12 is, instructed by, for example, the user. Alternatively, in a case where a predetermined condition is achieved, the processing automatically proceeds to the processing in and after S12. In such a case, for example, the number of jobs received in S10 or an amount of printing (for example, the number of pages to be printed) may reach a predetermined threshold value, reach a predetermined time, and the like. Further, as another example of the condition, a remaining time period until all the jobs being executed by the plurality of printing devices 200 connected to the printing control device 100 are completed may be equal to or less than the threshold value.

In S12, the status sensing module 104 senses a current status of each printing device 200, for example, a current amount of remaining sheets.

Next, the job selection module 106 calculates an amount of used sheets for the job from the data of each job received in S10 (S14). The amount of used sheets for the job may be calculated on the basis of, for example, the number of pages of a document represented by the printing data of the job, an instruction for imposition in the printing attributes of the job, an instruction for the number of copies to be printed, and the like.

Further, the job selection module 106 calculates, for each printing device 200, a printing time period or a printing rate, assuming that the current printing device 200 performs printing of each job received in S10 (S16). Here, the printing rate is a number of printed sheets per unit time period (for example, one minute) in a case where the current printing device 200 performs printing of the job. In other words, the printing rate is the amount of used sheets per unit time period, that is, the sheet consumption rate. The printing rate is calculated by a known calculation method, on the basis of the printing attributes of the jobs (for example, color/monochrome distinction, types of sheets to be used, and presence or absence of special processing such as gloss processing), and information indicating performance of the printing device 200. The printing time period is a time period required for printing the job with the current printing device, and is calculated by, for example, dividing the amount of used sheets for the job by the above-mentioned printing rate.

The job selection module 106 stores values calculated in S14 and S16 as, for example, a table shown in FIG. 3. In the table shown as an example in FIG. 3, each row represents the printing device 200 under the control of the printing control device 100, and each column represents each job. Then, a group of three values of the printing time period, the amount of used sheets, and the printing rate is set in a cell at a position where the row intersects with the column. Among these, the printing time period is a time period required to cause the printing device 200 corresponding to the row of the cell to perform printing of the job corresponding to the column of the cell. The amount of used sheets is an amount of sheets used for the job. Since the job is common to each cell in the same column, a value of the amount of used sheets is the same. The printing rate is the number of printed sheets per unit time period in a case where the printing device 200 prints the job. By multiplying the printing rate in the cell by the printing time period, the amount of used sheets in that cell is obtained. In the example of FIG. 3, the amounts of used sheets for jobs 1, 2, 3, 4, 5, and 6 are 400, 200, 100, 300, 300, and 400 sheets, respectively. Further, the amounts of remaining sheets in the printing devices 1, 2, and 3 at the time point of sensing in S12 are 600, 500, and 400 sheets, respectively.

Next, the job selection module 106 assigns the job to each printing device 200 such that the sheet refilling timings of the plurality of printing devices 200 are shifted from each other on the basis of the printing rate or the printing time period for each job of each printing device 200 obtained in S16 (S18).

Here, the sheet refilling timing of the printing device 200 is defined as, for example, a time at which sheet refilling is performed on the printing device 200. The sheet refilling operation is executed in a case where the sheet run-out occurs in the printing device 200. Therefore, in the following description, the time of occurrence of sheet run-out is defined as the sheet refilling timing.

Further, "the sheet refilling timings of the plurality of printing devices 200 are shifted from each other" means that, for example, periods, during which the sheet refilling operations are performed in each of the plurality of printing devices 200, do not overlap each other. For example, it is assumed that a length of the time period required for the sheet refilling operation of each printing device 200 is the same constant length. The length of the time period is referred to as a "sheet refilling time period length". In such a case, the period, during which the sheet refilling operation is performed in the printing device 200, is a period of the sheet refilling time period length starting from the time of occurrence of the sheet run-out in the printing device 200.

In the example, in order for the periods of the sheet refilling operations of the plurality of printing devices 200 not to overlap each other, the time of occurrence of the sheet run-out in the printing devices 200, that is, the interval between the sheet refilling timings may be equal to or greater than the sheet refilling time period length. Strictly speaking, in any two of the plurality of printing devices 200, the interval between the sheet refilling timings of the two printing devices 200 may be equal to or greater than the sheet refilling time period length. In addition, in an actual field, a certain amount of time period is required for a worker to move to the printing device 200 in which the sheet run-out occurs. Therefore, the sheet refilling time period length may be adjusted to a length including a movement time period of the worker.

In S18, the job selection module 106 calculates how the plurality of jobs received in S10 are assigned to the respective printing devices 200 such that the sheet refilling timings of the printing devices 200 are shifted from each other. Then, in a case where such an assignment method is found, the job is assigned to each printing device 200 in accordance with the assignment method.

Figure 2:
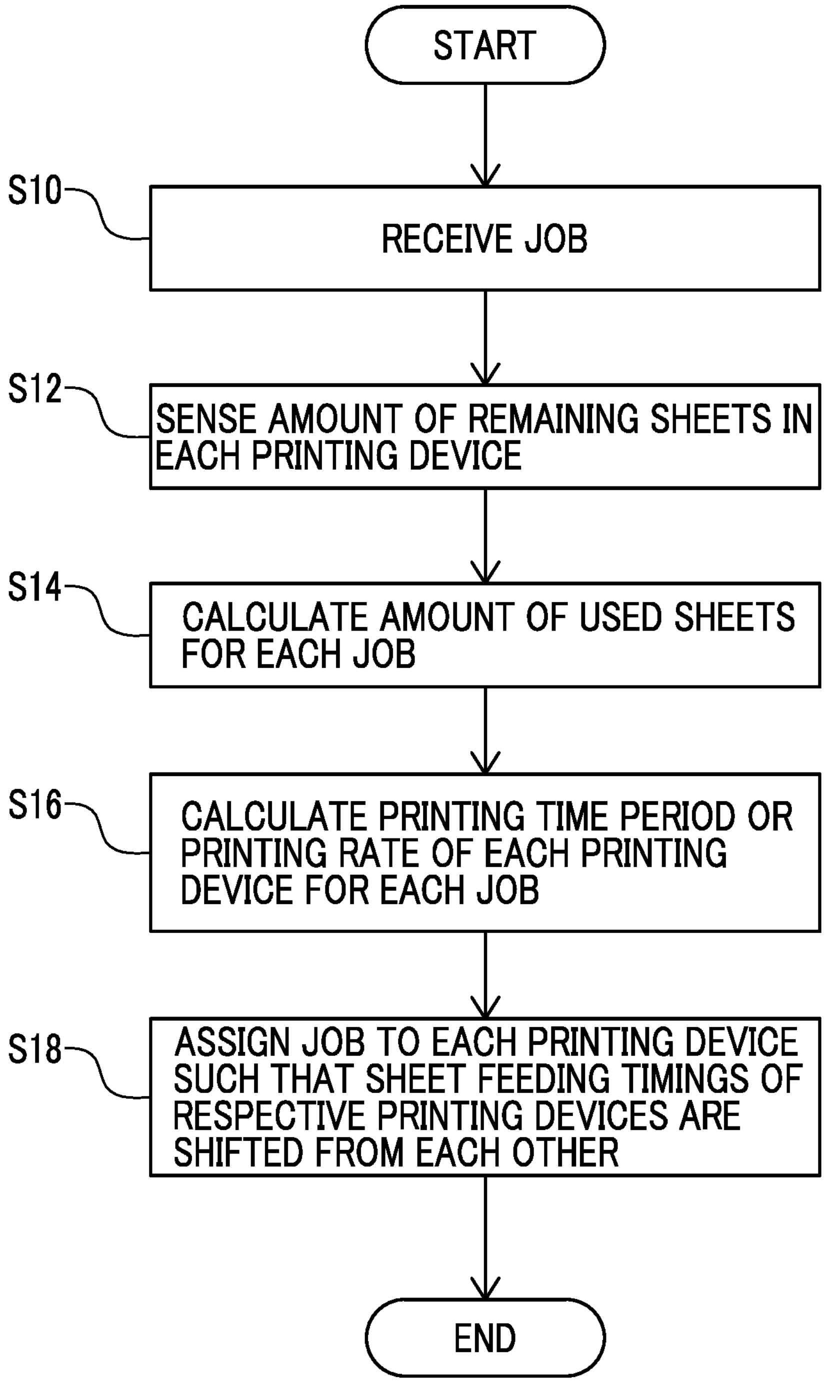
FIG. 2 is a diagram showing an example of a processing procedure which is executed by the printing control device.
Figure 4:
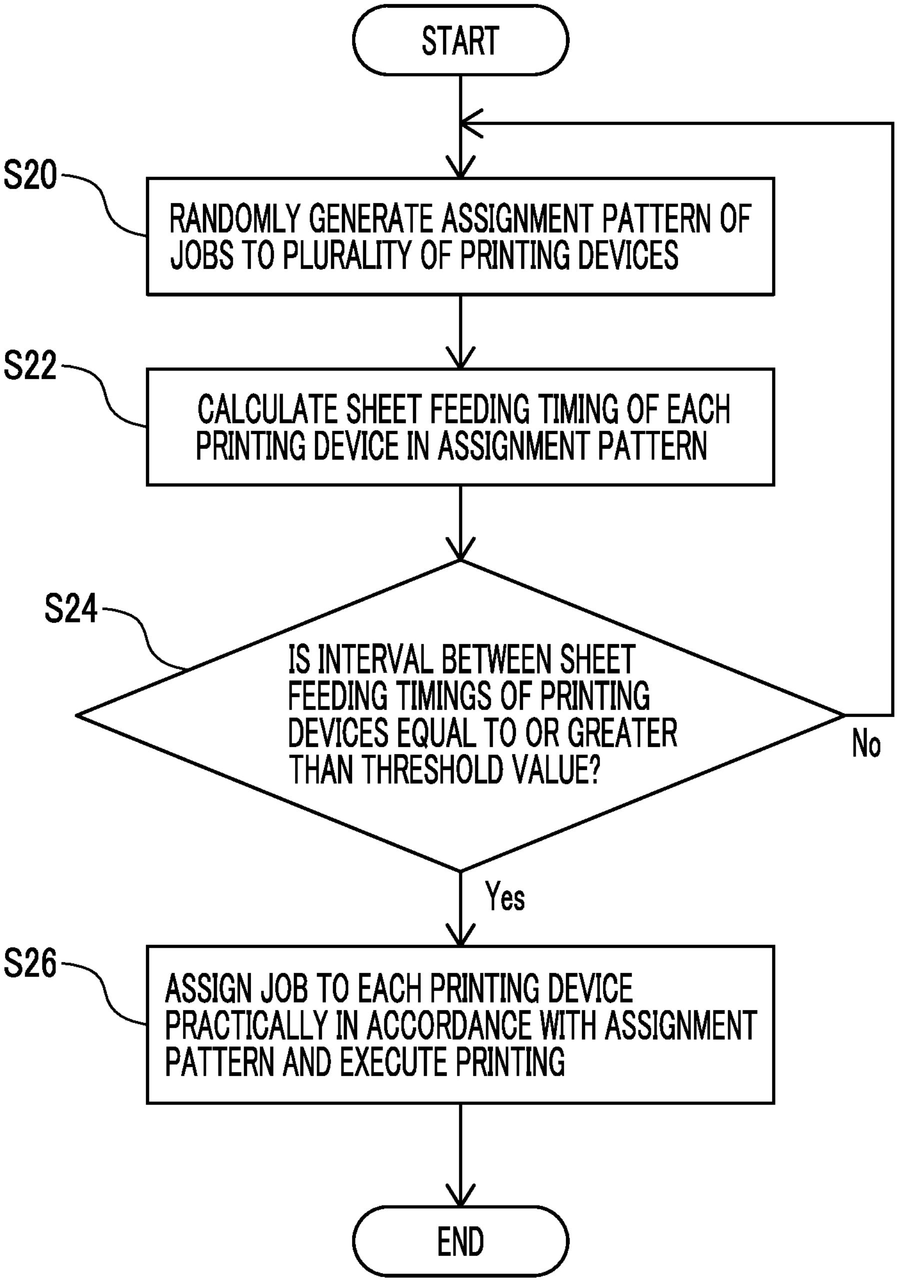
FIG. 4 is a diagram showing an example of a detailed processing procedure of S18 in the procedure of FIG. 2.

An example of detailed processing in S18 of FIG. 2 is shown in FIG. 4. In the procedure, the job selection module 106 obtains an assignment pattern in which the sheet refilling timings of the respective printing devices 200 are shifted from each other, on the basis of the amount of remaining sheets of each of the plurality of printing devices 200 and the sheet consumption rate for each job. Then, the job is assigned to each printing device 200 in accordance with the obtained assignment pattern.

Here, the assignment pattern of the jobs is a pattern indicating to which of the plurality of printing devices 200 each of the plurality of jobs is assigned. For example, in a case where four jobs a, b, c, and d are printed by two printing devices A and B, an example of the assignment pattern is that the jobs a and b are assigned to the printing device A and the jobs c and d are assigned to the printing device B.

In the example, the job selection module 106 randomly generates assignment pattern of jobs to the plurality of printing devices 200 (S20). That is, the assignment pattern is generated by randomly mapping the plurality of jobs received in S10 to the plurality of printing devices 200. At the time, the plurality of jobs for one printing device 200 may be mapped.

Next, the job selection module 106 calculates a sheet refilling timing of each printing device 200 in a case where it is assumed that the job is assigned in accordance with the assignment pattern generated in S20 by using the status estimation module 108 (S22). The calculation is performed, for each printing device 200, by using the amount of remaining sheets in the printing device 200 sensed in S12, the amount of used sheets for each job assigned to the printing device 200 in S20, and the printing rate or the printing time period of the printing device 200 for each job.

In the calculation, the status estimation module 108 estimates a change in the status in a case where the job is assigned to the printing device 200 in accordance with the assignment pattern. The processing of the estimation is, for example, as follows. That is, in the example, the status estimation module 108 determines, in the order of jobs assigned to the printing device 200, whether or not the amount of used sheets for the job is equal to or greater than the amount of remaining sheets in the printing device 200. In a case where the result of the determination is No, that is, in a case where the amount of used sheets is less than the amount of remaining sheets, the current time is updated to a time at the printing completion time point of the job by adding the printing time period of the printing device 200 for the job to the current time. At the time, by subtracting the amount of used sheets from the amount of remaining sheets, the value of the amount of remaining sheets is updated to a value at the printing completion time point of the job. Then, the above-mentioned determination is repeated for the next job. In a case where the result of the determination is No, the current time and the amount of remaining sheets are updated in the same manner as described above. The current time is a time at which the next job is started, and the amount of remaining sheets after the update is an amount of remaining sheets at that time.

In a case where the amount of used sheets for a certain job is equal to or greater than the amount of remaining sheets while such processing is repeated, the sheet run-out occurs while the printing device 200 is executing the job or at the end of the execution. In such a case, the job selection module 106 calculates a time period required to entirely use the amount of remaining sheets at the printing rate of the printing device 200 for the job. Then, the job selection module 106 obtains a time at which the sheet run-out occurs in the printing device 200 by adding the time period obtained by the calculation to the current time. The time is the sheet refilling timing of the printing device 200.

It should be noted that the calculation of the sheet refilling timing of each printing device 200 by the status estimation module 108 described above can also be regarded as a calculation to find the length of the time period required to entirely use the amount of remaining sheets in the printing device 200 by executing the assigned job for each printing device 200.

Next, the job selection module 106 determines whether or not the intervals between the sheet refilling timings of the respective printing devices 200 calculated in S22 are all equal to or greater than the predetermined threshold value (S24). The sheet refilling timing of the printing device 200 is obtained by adding the time period required for the printing device 200 to entirely use the amount of remaining sheets to a time of the printing start. Therefore, the determination in S24 is equivalent to determination as to whether or not the intervals between time periods required for the printing devices 200 to entirely use the amounts of remaining sheets are equal to or greater than the predetermined threshold value.

The threshold value used in S24 may be the above-mentioned sheet refilling time period length. Further, the threshold value may be set on the basis of the sheet refilling time period length, for example, by adding a predetermined value to the sheet refilling time period length. In a case where even one interval between the sheet refilling timings of the printing device 200 is less than the threshold value, the determination result in S24 is No. In a case where none of the intervals between the sheet refilling timings of the printing device 200 is less than the threshold value, the determination result in S24 or Yes is obtained.

In a case where the result of the determination in S24 is No, the job selection module 106 returns the processing to S20, randomly generates the assignment patterns of the jobs for the plurality of printing devices 200, and then repeats the processing of the steps after S22.

In a case where the determination result in S24 is Yes, the job selection module 106 actually transmits the job to each printing device 200 through the printing device communication module 110 in accordance with the assignment pattern in which the determination result in S24 is Yes (S26). Each printing device 200 executes the job received from the printing device communication module 110. Thereby, the printing result of the job is obtained.

By assigning the job to each printing device 200 in accordance with the procedure of FIG. 4, the sheet refilling timings do not overlap between the printing devices 200. Therefore, it is not necessary for the worker to handle the sheet refilling of the plurality of printing devices 200 at the same time.

Next, yet another example of the processing procedure of S18 in FIG. 2 will be described with reference to FIGS. 5 to 9.

In general, in the procedure, first selection processing is first executed. In the first selection processing, the job selection module 106 selects, for each of the plurality of printing devices 200, the job to be assigned to the current printing device 200 in accordance with a predetermined assignment policy within a range in which the amount of remaining sheets in the current printing device 200 does not reach 0. After the first selection processing, the job selection module 106 selects the job to be assigned to each of the plurality of printing devices 200, among the jobs remaining without being assigned to any of the plurality of printing devices 200 in the first selection processing, such that the sheet refilling timings of the plurality of printing devices 200 are shifted from each other. Through the first selection processing and the subsequent selection, the assignment pattern of each job to each printing device 200 is obtained.

Here, the assignment policy is a policy for determining a job to be assigned to the printing device 200. For example, in the procedure shown as an example in FIG. 5, regarding the printing device 200, the jobs are assigned in order from the job having the highest printing rate in the printing device 200. However, this is an example of the assignment policy. Further, in the procedure of FIG. 5, the printing devices 200 are selected one by one in accordance with the designated sorting order, and the jobs are assigned to the selected printing devices 200. The assignment policy may include an order of selecting such a printing device 200 (that is, a sorting order in the above-mentioned example).

Hereinafter, the procedure of FIG. 5 will be described. In the procedure shown in FIG. 5, the step group from S30 to S44 is an example of the procedure of the first selection processing described above. Steps S46 and S48 are examples of the selection processing executed after the first selection processing.

Figure 5:
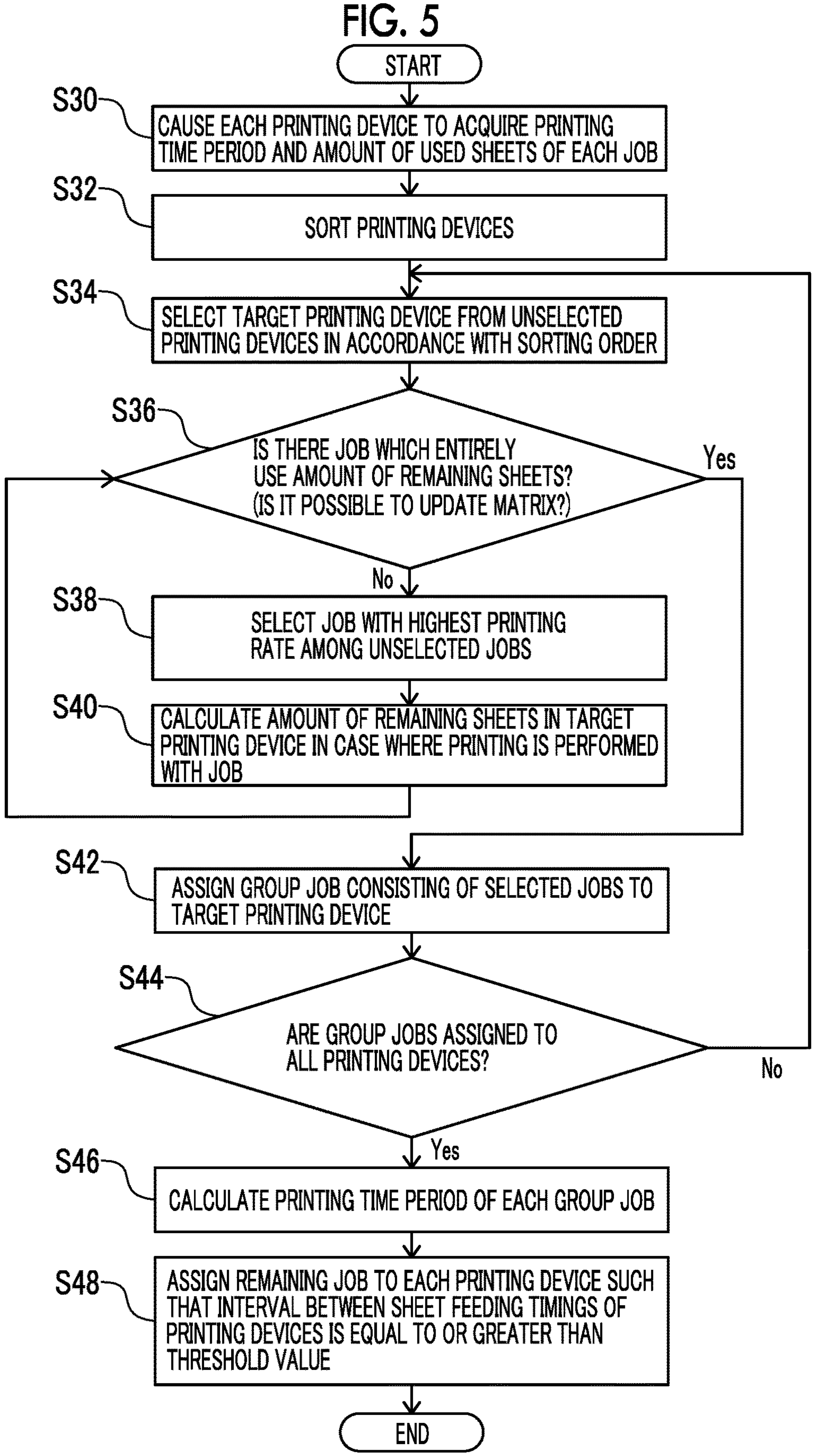
FIG. 5 is a diagram showing another example of the detailed processing procedure of S18 in the procedure of FIG. 2.

In the procedure of FIG. 5, first, the job selection module 106 acquires values of the printing time period and the amount of used sheets for each job by each printing device 200 (S30). These values are obtained in S14 and S16 of the procedure of FIG. 2. Next, the job selection module 106 sorts the plurality of printing devices 200 in accordance with a sorting order which is designated by the user (S32). The sorting order includes, for example, an order in which the amount of remaining sheets is high or low, an order in which the printing speed is high or low, an order in which the printing speed is close to or far from the sheet storage place, an order in which the amount of remaining sheets is close to or far from the waiting cell of the worker, and the like. The printing control device 100 presents a list of the selections of the sorting order to the user, and receives the selection from the user. Further, a default sorting order may be defined, and the default sorting order may be employed in a case where the user does not explicitly select the sorting order.

Next, the job selection module 106 selects the printing device 200 (hereinafter, referred to as the target printing device 200) as a target in the processing of S36 to S42 from the plurality of printing devices 200 (S34). Here, among the printing devices 200 that have not yet been selected, the first printing device 200 in the sorting order is selected as the target printing device 200.

Next, the job selection module 106 determines whether or not there is a job which entirely uses the amount of remaining sheets in the target printing device 200, that is, a job in which the amount of used sheets is equal to or greater than the amount of remaining sheets, among the jobs that have not yet been selected (S36). The determination is equivalent to determination as to whether or not the matrix for determination shown as an example in FIG. 6 can be updated.

As shown in FIG. 6, the matrix for determination is a two-dimensional matrix composed of rows corresponding to the individual printing devices 200 and columns corresponding to the individual jobs. A value is set in a cell at a position where the row intersects with the column, in a case where the amount of used sheets for the job in the column is equal to or greater than the amount of remaining sheets in the printing device 200 in the row. The value to be set is a time period required for the printing device 200 to consume the amount of remaining sheets in printing the job. Further, in a case where the amount of used sheets for the job in the column is less than the amount of remaining sheets in the printing device 200 in the row, the value is not set in the cell. In addition, in a case where it has been determined that the job is assigned to any of the printing devices 200, a value indicating a state where the job has been assigned is set in each cell of the column of the job.

In a case where the determination result in S36 is affirmative (that is, Yes), the job selection module 106 updates the matrix for determination. That is, in such a case, there is one or more jobs with an amount of used sheets equal to or greater than the amount of remaining sheets of the target printing device 200. Therefore, for each of such jobs, the value is set in the cell in which the column of the job intersects with the row of the target printing device 200, in the matrix for determination. Then, the job selection module 106 advances the processing to S42. In a case where the determination result in S36 is negative (that is, No), the job selection module 106 advances the processing to S38.

In S38, the job selection module 106 selects the job to be assigned to the target printing device 200. Here, among the jobs that have not yet been selected, the job with the highest printing rate is selected.

Next, the job selection module 106 calculates an amount of remaining sheets in the target printing device 200 after printing in a case where it is assumed that the job selected in S38 is assigned to the target printing device 200 and executed (S40). The calculation is achieved by subtracting the amount of used sheets for the job from the amount of remaining sheets of the target printing device 200 immediately before execution of S40.

After S40, the job selection module 106 returns the processing to S36. In S36, it is determined whether or not there is a job which entirely uses the amount of remaining sheets calculated in S40, that is, a job in which the amount of used sheets is equal to or greater than the amount of remaining sheets, among the jobs that have not yet been selected.

In a case where the determination result in S36 is negative (that is, No), the job selection module 106 returns the processing to S38 and selects the next job to be assigned to the target printing device 200. Then, the processing of S40 and S36 is executed for the selected job.

In such a manner, the job selection module 106 repeats the processing of S36 to S40 until the determination result of S36 is affirmative (that is, Yes).

In a case where the determination result in S36 is Yes, the job selection module 106 generates a group job consisting of jobs selected in the repetition of the loop of S36 to S40, and assigns the group job to the target printing device 200. (S42). In S42, the job selection module 106 adds information indicating that the group job is assigned to the target printing device 200 to the data of the assignment pattern being created. The job determined in S36 to entirely use the amount of remaining sheets of the target printing device 200 is not the job selected in S38. Therefore, the job is not included in the group job assigned to the target printing device 200. The target printing device 200 does not cause sheet run-out even in a case of performing printing in accordance with all the jobs included in the group jobs, but causes sheet run-out in a case of further performing printing in accordance with any of the jobs for which it is determined that the amount of remaining sheets is entirely used in S36. As described above, the group job uses an amount of sheets that causes the target printing device 200 to reach a state immediately before the sheet run-out occurs.

After S42, the job selection module 106 determines whether or not the group jobs have been assigned to all the printing devices 200 (S44). In a case where the result of the determination is No, the job selection module 106 returns the processing to S34, selects a printing device 200 that has not been selected so far as a target printing device, and repeats the processing of S36 to S44.

At a time point at which the result of the determination in S44 is Yes, group jobs have been assigned to all the printing devices 200. Further, at the time point, the following information is held in the cell at the position where the row of the printing device 200 intersects with the column of the job of the matrix for determination (refer to FIG. 6). That is, in a case where the job belongs to a group job assigned to any of the printing devices 200, a value, which indicates that the job has been assigned to the printing device 200 in a form including the group job, is set in the cell. In a case where the job does not belong to any group job assigned to any of the printing devices 200, the information held in the cell is one of the following two types. That is, in a case where the corresponding group job is assigned to the printing device 200 and the job is additionally assigned to the printing device 200 and then the amount of remaining sheets in the printing device 200 is entirely used, a value indicating a time period is set in the cell. The time is a time period until the printing device 200 entirely uses the amount of remaining sheets remaining after executing the group job in the execution of the additional job. In a case where the job is additionally assigned and even then the amount of remaining sheets in the printing device 200 is not entirely used, the cell remains blank (or a predetermined value indicating that the amount of remaining sheets is not entirely used is set in the cell).

In a case where the result of the determination in S44 is Yes, the job selection module 106 calculates a printing time period of each group job assigned to each printing device 200 (S46). The printing time period of a group job is the total printing time period of each job included in the group job.

Then, the job selection module 106 obtains the job to be assigned to each printing device 200 from the jobs that do not belong to any of the group jobs (S48).

At a time point in which S48 is started, a corresponding group job has been assigned to each printing device 200. In S48, the job selection module 106 additionally assigns the job that does not belong to any group job to each printing device 200 such that the intervals between the sheet refilling timings of the printing devices 200 are all equal to or greater than the threshold value. The job additionally assigned to the printing device 200 in S48 may be selected from the jobs corresponding to the cells in which a value of the time period is set, among the cells in the row of the printing device 200 in the matrix for determination (refer to, for example, FIG. 6). According to the job selected in such a manner, the amount of remaining sheets should be entirely used after the group job of the printing device 200 is executed, and thus the job causes the printing device 200 to sheet run-out. Focusing on a certain printing device 200, by adding the value of the cell in the row of the printing device 200 in the matrix for determination to the printing time period of the group job assigned to the printing device 200 (which has been calculated in S46), the time period until sheet run-out occurs in the printing device 200 is obtained. By adding the time period to the current time, a time at which sheet run-out occurs in the printing device 200, that is, a sheet refilling timing can be obtained.

In S48, the job selection module 106 randomly assigns, to each printing device 200, the job corresponding to the cell in which a value of the time period is set in the row of the printing device 200 on the matrix for determination. In the assignment, the same job is not repetitively assigned to the plurality of printing devices 200. The job selection module 106 calculates a sheet refilling timing of each printing device 200 in the case of the assignment in such a manner, and determines whether or not all the intervals between the sheet refilling timings are equal to or greater than the threshold value. In a case where the result of the determination is negative, that is, in a case where there is an interval between the sheet refilling timings of the printing devices 200 that is less than the threshold value, the job selection module 106 randomly reassigns the jobs to the printing devices 200. The reassignment is repeated until it is determined that the intervals between the sheet refilling timings are all equal to or greater than the threshold value. In a case where the result of the determination is affirmative, that is, in a case where all the results of the determination are equal to or greater than the threshold value, the job selection module 106 adopts the assignment of the job to each printing device 200 at that time.

Then, the job selection module 106 transmits, for each printing device 200, the job group belonging to the corresponding group job and the job additionally assigned in S48 to the printing device 200, and causes the printing device 200 to execute printing.

The processing flow of the procedure of FIG. 5 will be described in more detail by using a specific example. Here, a specific example, in which the three printing devices 1, 2, and 3 shown as examples in FIG. 3 processes six jobs 1, 2, 3, 4, 5, and 6, is adopted. In the specific example, at a time point at which the procedure of FIG. 5 is started, the amounts of remaining sheets in the printing devices 1, 2, and 3 are 600, 500, and 400 sheets, respectively, and the amounts of used sheets for the jobs 1, 2, 3, 4, 5, and 6 are 400, 200, 100, 300, 300, and 400, respectively.

FIG. 6 shows an initial state of the matrix for determination in the specific example, that is, a state of the matrix for determination at a time point in which the processing of FIG. 5 is started. At the time point, the maximum value of the amounts of used sheets for the jobs is 400 sheets for the jobs 1 and 6, and the amounts of remaining sheets in the printing devices 1 and 2 are not entirely used by the amount of used sheets, but the amount of remaining 400 sheets in the printing device 3 is entirely used. Therefore, as shown in FIG. 6, 26.67 seconds and 40 seconds are set in the cells at the positions where the columns of jobs 1 and 6 of the matrix for determination intersect with the row of the printing device 3. 26.67 seconds and 40 seconds are time periods required for the amount of remaining 400 sheets in the printing device 3 to be entirely used respectively in the jobs 1 and 6. Regarding cells corresponding to combinations of jobs other than the above-mentioned jobs and the printing device, the cells remain blank since the amounts of remaining sheets are not entirely used in the printing device in terms of the amounts of used sheets for the jobs.

Thereafter, the procedure of FIG. 5 is executed, and it is assumed that the printing device 1 is selected as a first target printing device in S34. In S38, among the unselected jobs, the jobs 1 and 2 have the highest printing rate in the printing device 1. Here, as an example, it is assumed that there is a sub-rule that selects the job with the lowest number in a case where there are a plurality of jobs having the same printing rate, and in S38, the job 1 is selected in accordance with the sub-rule. In S40, the amount of remaining sheets after the printing device 1 performs printing in accordance with the job 1 is calculated. Since the amount of remaining sheets in the printing device 1 is 600 sheets at present and the amount of used sheets for the job 1 is 400 sheets, the amount of remaining sheets in the printing device 1 obtained in S40 is 200 sheets. In the next S36, a job, in which 200 sheets as new amount of remaining sheets in the printing device 1 are entirely used, is searched for from the jobs that have not been selected so far. In the example, among the unselected jobs 2 to 6, the jobs 2, 4, 5, and 6 are found as jobs in which the amounts of remaining sheets are equal to or greater than 200 sheets. At the printing rates 40, 30, 20, and 20 for the jobs 2, 4, 5, and 6 of the printing device 1, the time periods for entirely using the amounts of remaining 200 sheets are 5, 6.67, 10, and 10 minutes, respectively. In S36, the matrix for determination is updated as shown in FIG. 7 in accordance with the result of such calculation.

In the matrix for determination shown in FIG. 7, a value (indicated as "done" in the drawing) indicating that the cell has been selected is set in each cell of the column of the job 1 currently selected. Further, the time periods of 5, 6.67, 10, and 10 minutes for entirely using the amounts of remaining 200 sheets are set in the respective cells corresponding to the jobs 2, 4, 5, and 6 in the row of the printing device 1.

Since the determination result in S36 is Yes, in the next S42, a group job consisting of the job 1 selected for the printing device 1 so far is generated, and the group job 1 is assigned to the printing device 1. In the next S44, since the printing device 200 to which the assignment of the group jobs has not yet been assigned remains, the processing returns to S34.

In S34, it is assumed that the printing device 2 is selected as the target printing device in accordance with the sorting order. In S38, among the unselected jobs, the job 4 having the highest printing rate in the printing device 2 is selected. In S40, by subtracting the amount of used 300 sheets for the job 4 from the amount of remaining 500 sheets in the printing device 2 at the time point, the amount of remaining sheets in the printing device 2 after printing of the job 4 is calculated as 200 sheets. In S36, the jobs 2, 5, and 6 are found as jobs which entirely use a new amount of remaining 200 sheets in the printing device 2 from the jobs that have not been selected so far. At the printing rates 25, 15, and 15 for the jobs 2, 5, and 6 of the printing device 2, the time periods for entirely using the amounts of remaining 200 sheets are 8, 13.33, and 13.33 minutes, respectively. In S36, the matrix for determination is updated as shown in FIG. 8 in accordance with the result of such calculation.

In the matrix for determination shown in FIG. 8, a value indicating that the selection has been made is set in each cell of the column of the job 4 currently selected. Further, the time periods of 8, 13.33, and 13.33 minutes for entirely using the amounts of remaining 200 sheets are set in the respective cells corresponding to the jobs 2, 5, and 6 in the row of the printing device 2.

Thereafter, since the determination result in S36 is Yes, in the next S42, a group job consisting of the job 4 selected for the printing device 2 so far is generated, and the group job is assigned to the printing device 2. In the next S44, since the printing device 200 to which the assignment of the group jobs has not yet been assigned remains, the processing returns to S34.

In S34, the printing device 3 is selected as the target printing device in accordance with the sorting order. In S38, among the unselected jobs, the job 3 having the highest printing rate in the printing device 3 is selected. In S40, by subtracting the amount of used 100 sheets for the job 3 from the amount of remaining 400 sheets in the printing device 3 at the time point, the amount of remaining sheets in the printing device 3 after printing of the job 3 is calculated as 300 sheets. In S36, the jobs 5 and 6 are found as jobs which entirely use a new amount of remaining 300 sheets in the printing device 3 from the jobs that have not been selected so far. At the printing rates 15 and 10 for the jobs 5 and 6 of the printing device 3, the time periods for entirely using the amounts of remaining 300 sheets are 20 and 30 minutes, respectively. In S36, the matrix for determination is updated as shown in FIG. 9 in accordance with the result of such calculation.

In the matrix for determination shown in FIG. 9, a value indicating that the cell has been selected is set in each cell of the column of the job 3 currently selected. Further, the time periods of 20 and 30 minutes for entirely using the amounts of remaining 300 sheets are set in the respective cells corresponding to the jobs 5 and 6 in the row of the printing device 3.

By the above-mentioned processing, group jobs are assigned to the three printing devices 1, 2, and 3, respectively. The matrix for determination at the time point is in the state shown in FIG. 9. At the time point, the jobs 2, 5, and 6 are not assigned to any of the printing devices 1, 2, and 3. At the time point, the determination result of S44 is Yes. In S46, the printing time periods of the group jobs respectively assigned to the printing devices 1, 2, and 3 are calculated. Since the group job assigned to the printing device 1 includes only the job 1, the printing time period is 10 minutes. Further, since the group job assigned to the printing device 2 includes only the job 4, the printing time period is 10 minutes. Since the group job assigned to the printing device 3 includes only the job 3, the printing time period is 4 minutes.

Next, in S48, for example, by repeatedly trying to randomly assign the jobs 2, 5, and 6 to the printing devices 1, 2, and 3, assignment, by which the interval between the sheet refilling timings of the printing devices 1, 2, and 3 is equal to or greater than the threshold value, is searched for. For example, in a case where the jobs 2, 5, and 6 are assigned to the printing devices 1, 2, and 3 in this order, the total printing time periods of the printing devices 1, 2, and 3 are 15, 23.33, and 34 minutes, respectively. The total printing time period is obtained by adding a value of 5 minutes of the cell in which the printing device 1 in the matrix for determination (refer to FIG. 9) intersects with the job 2, a value of 13.33 minutes of the cell in which the printing device 2 intersects with the job 5, and a value of 30 minutes of the cell in which the printing device 3 intersects with the job 6 to the printing time periods of 10, 10, and 4 minutes for the group jobs in the printing devices 1, 2, and 3 obtained in S46. In a case where the threshold value is 5 minutes, the total printing time periods 15, 23.33, and 34 minutes of the printing devices 1, 2, and 3 have differences therebetween which are equal to or greater than the threshold value. Therefore, a condition that the interval between the sheet refilling timings is equal to or greater than the threshold value is satisfied. Therefore, a pattern, in which the jobs 2, 5, and 6 are assigned to the printing devices 1, 2, and 3 in this order, can be employed. Considering the group jobs, an assignment pattern, in which the jobs 1 and 2 are assigned to the printing device 1, the jobs 4 and 5 are assigned to the printing device 2, and jobs 3 and 6 are assigned to the printing device 3 respectively, is finally employed. The job selection module 106 assigns jobs to the printing devices 1, 2, and 3 in accordance with the assignment patterns and causes the printing device 1, 2, and 3 to execute the jobs.

Next, still another example of the processing procedure of S18 of FIG. 2 will be described with reference to FIGS. 10 to 12.

Figure 10:
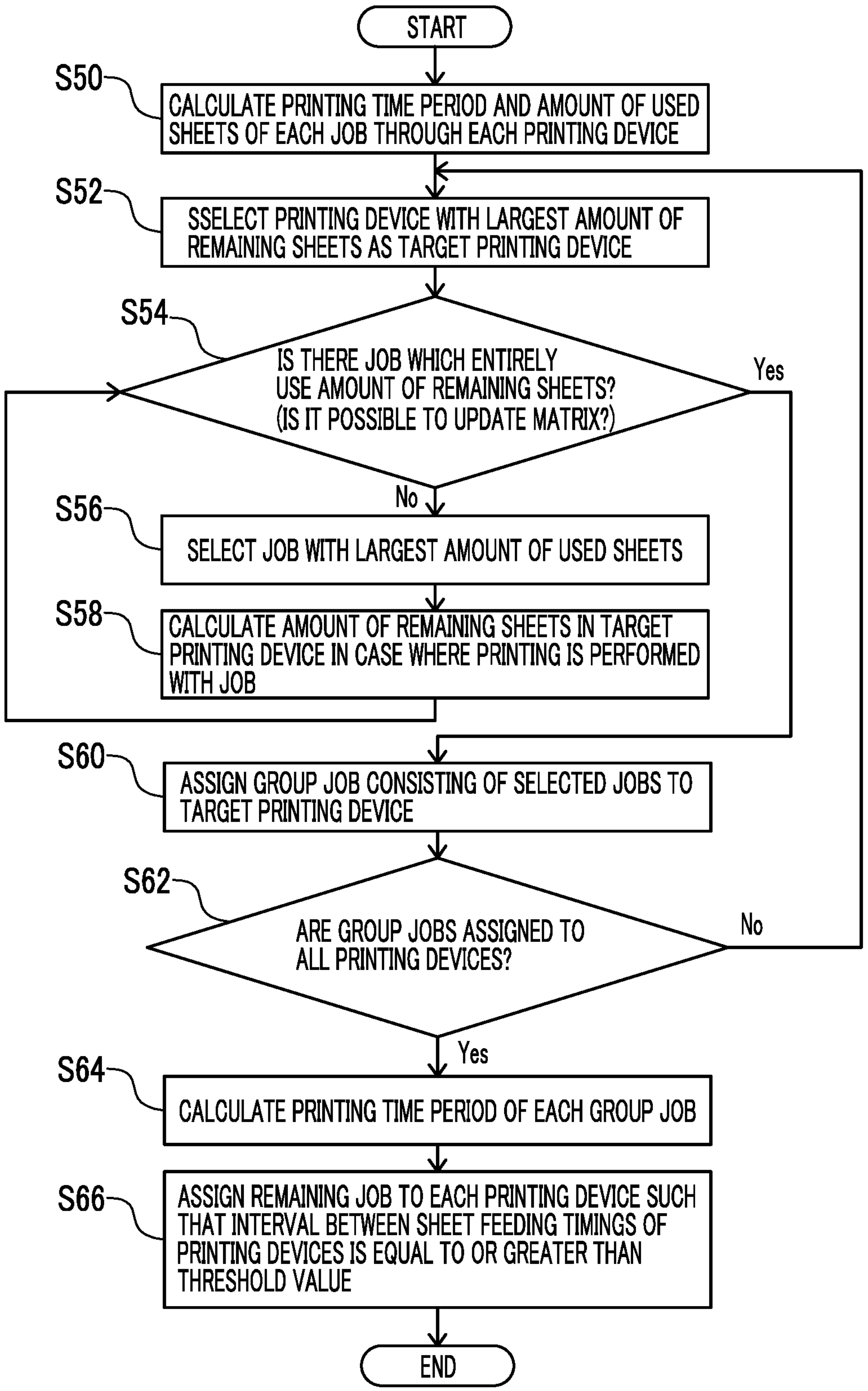
FIG. 10 is a diagram showing still another example of the detailed processing procedure of S18 in the procedure of FIG. 2.

In the example, the job selection module 106 executes the procedure shown as an example in FIG. 10. In the procedure of FIG. 10, similar to the procedure of FIG. 5, the first selection processing is first executed, and then the jobs to be assigned to each of the plurality of printing devices 200 are selected, among the jobs remaining without being assigned to any of the jobs, such that the sheet refilling timings of the plurality of printing devices 200 are shifted from each other. The example differs from the example of FIG. 5 in the assignment policy in the first selection processing. The assignment policy in the example is to assign jobs with a large amount of used sheets in order from the printing device 200 having a large amount of remaining sheets.

In the procedure of FIG. 10, first, the job selection module 106 acquires values of the printing time period and the amount of used sheets for each job by each printing device 200 (S50). Next, the job selection module 106 selects the printing device 200 having the largest amount of remaining sheets as the target printing device, among the printing devices 200 that have not been selected as the target printing device 200 until now (S52).

Next, the job selection module 106 determines whether or not there is a job which entirely uses the amount of remaining sheets in the target printing device, among the jobs that have not yet been selected (S54). In a case where the result of the determination is Yes, the matrix for determination is updated.

In a case where the result of the determination in S54 is No, the job selection module 106 selects the job having the largest amount of amount of used sheets, among the jobs that have not been selected so far, as the job to be assigned to the target printing device 200 (S56).

Next, the job selection module 106 calculates an amount of remaining sheets in the target printing device 200 after printing in a case where it is assumed that the job selected in S56 is assigned to the target printing device 200 and executed (S58).

Next, the job selection module 106 determines whether or not there is a job which entirely uses the amount of remaining sheets calculated in S58, among the jobs that have not yet been selected (S54).

The job selection module 106 repeats the processing of S54 to S58 until the determination result of S54 is Yes.

In a case where the determination result in S54 is Yes, the job selection module 106 generates a group job consisting of jobs selected in the repetition of the loop of S54 to S58, and assigns the group job to the target printing device 200. (S60).

Next, the job selection module 106 determines whether or not the group jobs have been assigned to all the printing devices 200 (S62). In a case where the result of the determination is No, the job selection module 106 returns the processing to S52, selects a printing device 200 which has not been selected so far as a target printing device, and repeats the processing of S54 to S62.

In a case where the result of the determination in S62 is Yes, the job selection module 106 calculates a printing time period of each group job assigned to each printing device 200 (S64). Then, the job selection module 106 additionally assigns a job that does not belong to any of the group jobs to each printing device 200 such that the intervals between the sheet refilling timings of the printing devices 200 are all equal to or greater than the threshold value (S66). Then, the job selection module 106 transmits, for each printing device 200, the job group belonging to the corresponding group job and the job additionally assigned in S66 to the printing device 200, and causes the printing device 200 to execute printing.

The processing flow of the procedure of FIG. 10 will be described in more detail by using a specific example. As the specific example, the printing devices 1, 2 and 3 and the jobs 1 to 6 shown in FIG. 3 are used as in the case of the procedure of FIG. 5.

The state of the matrix for determination at the time point of start of the procedure of FIG. 10 in the specific example is the same as that shown in FIG. 6.

Thereafter, in S52 of the procedure of FIG. 10, the printing device 1 having the maximum amount of remaining 600 sheets is selected as the target printing device. At the time point of S56, among the unselected jobs, the jobs 1 and 6 (both of which have amounts of remaining 400 sheets) each have the largest amount of used sheets. Here, as an example, it is assumed that the job 1 is selected in accordance with the sub-rule that the job with the lowest number is selected in a case where there are a plurality of jobs having the maximum amount of remaining sheets. S58 and S54 are the same processing as S40 and S36 of the procedure of FIG. 5. The status, in which the job 1 is selected for the printing device 1, is the same as that in a case where S40 and S36 are first executed in the procedure of FIG. 5 with respect to the specific example shown in FIG. 3. Therefore, at a time point at which S54 is executed, the matrix for determination is the same as that shown in FIG. 7.

Since the determination result in S54 is Yes, in the next S60, a group job consisting of the job 1 selected for the printing device 1 so far is generated, and the group job 1 is assigned to the printing device 1. In the next S62, since the printing device 200 to which the assignment of the group jobs has not yet been assigned remains, the processing returns to S52.

In S52, among the unselected printing devices 2 and 3, the printing device 2 having the maximum amount of remaining sheets is newly selected as the target printing device. In S56, among the unselected jobs 2 to 6, the job 6 having the largest amount of used sheets is selected. In S58, by subtracting the amount of used 400 sheets for the job 6 from the amount of remaining 500 sheets in the printing device 2 at the time point, the amount of remaining sheets in the printing device 2 after printing of the job 6 is calculated as 100 sheets. In S54, the jobs 2, 3, 4, and 5 are found as jobs which entirely use a new amount of remaining 100 sheets in the printing device 2 from the jobs that have not been selected so far. At the printing rates 25, 20, 30, and 15 for the jobs 2, 3, 4, and 5 of the printing device 2, the time periods for entirely using the amounts of remaining 100 sheets are 4, 5, 3.33, and 6.66 minutes, respectively. In S54, the matrix for determination is updated as shown in FIG. 11 in accordance with the result of such calculation.

Thereafter, since the determination result in S54 is Yes, in the next S60, a group job consisting of the job 6 selected for the printing device 2 so far is generated, and the group job is assigned to the printing device 2. In the next S62, since the printing device 200 to which the assignment of the group jobs has not yet been assigned remains, the processing returns to S52.

In S52, the only remaining printing device 3 is selected as the target printing device. In S56, among the unselected jobs 4 and 5, the jobs 4 having the largest amount of used sheets, the job 4 is selected in accordance with the above-mentioned sub-rule. In S58, by subtracting the amount of used 300 sheets for the job 4 from the amount of remaining 400 sheets in the printing device 3 at the time point, the amount of remaining sheets in the printing device 3 after printing of the job 4 is calculated as 100 sheets. In S54, the jobs 2, 3 and 5 are found as jobs which entirely use a new amount of remaining 100 sheets in the printing device 3 from the jobs that have not been selected so far. At the printing rates 20, 25, and 15 for the jobs 2, 3, and 5 of the printing device 3, the time periods for entirely using the amounts of remaining 100 sheets are 5, 4, 6.66 minutes, respectively. In S54, the matrix for determination is updated as shown in FIG. 12 in accordance with the result of such calculation.

At the time point, the determination result of S62 is Yes. In the next S64, the printing time periods of the group jobs respectively assigned to the printing devices 1, 2, and 3 are calculated. Since the group job assigned to the printing device 1 includes only the job 1, the printing time period is 10 minutes. Further, since the group job assigned to the printing device 2 includes only the job 6, the printing time period is 26.66 minutes. Since the group job assigned to the printing device 3 includes only the job 4, the printing time period is 15 minutes.

Next, in S66, by repeatedly trying to randomly assign the remaining jobs 2, 3, and 5 to the printing devices 1, 2, and 3, assignment, by which the interval between the sheet refilling timings of the printing devices 1, 2, and 3 is equal to or greater than the threshold value, is searched for. For example, in a case where the jobs 2, 3, and 5 are assigned to the printing devices 1, 2, and 3 in this order, the total printing time period of the printing devices 1, 2, and 3 is 15, 31.66, and 21.66 minutes, respectively. The total printing time period is obtained by adding a value of 5 minutes of the cell in which the printing device 1 in the matrix for determination (refer to FIG. 12) intersects with the job 2, a value of 5 minutes of the cell in which the printing device 2 intersects with the job 3, and a value of 6.66 minutes of the cell in which the printing device 3 intersects with the job 5 to the printing time periods of 10, 26.66, and 15 minutes for the group jobs in the printing devices 1, 2, and 3 obtained in S64. In a case where the threshold value is 5 minutes, the total printing time periods 15, 31.66, and 21.66 minutes of the printing devices 1, 2, and 3 have differences therebetween which are equal to or greater than the threshold value. Therefore, a condition that the interval between the sheet refilling timings is equal to or greater than the threshold value is satisfied. Therefore, a pattern, in which the jobs 2, 3, and 5 are assigned to the printing devices 1, 2, and 3 in this order, can be employed. Considering the group jobs, an assignment pattern, in which the jobs 1 and 2 are assigned to the printing device 1, the jobs 6 and 3 are assigned to the printing device 2, and jobs 4 and 5 are assigned to the printing device 3 respectively, is finally employed. The job selection module 106 assigns jobs to the printing devices 1, 2, and 3 in accordance with the assignment patterns and causes the printing device 1, 2, and 3 to execute the jobs.

An example of a procedure of the processing of determining an assignment pattern of the jobs has been described above for some assignment policies.

The assignment policies described so far are merely exemplary. The printing control device 100 may use another assignment policy in the first selection processing. For example, the printing control device 100 may present a list of assignment policy options to a user and receive the user's selection from the list. The printing control device 100 executes the first selection processing in accordance with the selected assignment policy, and then assigns the job, which remains without being assigned to any of the printing devices 200 through the first selection processing, to any of the printing devices 200 such that the differences between the sheet refilling timings of the respective printing device 200 are equal to or greater than the threshold value.

Next, a first modification example will be described. In the modification example, the printing control device 100 acquires the information defining the sheet refilling order, and calculates an assignment pattern of the jobs such that the sheet refilling timing of each printing device 200 arrives at a corresponding position in the sheet refilling order.

The sheet refilling order is an order in which sheet refilling is performed on each printing device 200.

The information for defining the sheet refilling order is, for example, information indicating a content of an explicit specification of the sheet refilling order from the user. For example, the printing control device 100 may present a screen for displaying a list of the printing devices 200, and may receive designation of the printing order of each printing device 200 from the user on the screen. The screen may display, for example, a map showing an installation position of each printing device 200.

Further, the information defining the sheet refilling order may be the above-mentioned map itself. From a relationship between the positions of the respective printing devices 200 indicated by the map, the shortest pathway to be circulated in each printing device 200 can be calculated by a known algorithm. The printing control device 100 may calculate such a pathway from the map and use the order of arrangement of the printing devices 200 along the pathway as the sheet refilling order. Further, in a case where the map includes information on the position of the sheet storage place, the printing control device 100 may obtain the shortest pathway that goes around each printing device 200 with the sheet storage place as a starting point, and may determine the sheet refilling order in accordance with the pathway.

In the modification example, in S18 of the processing procedure of FIG. 2, the printing control device 100 determines the job to be assigned to each printing device 200 such that the order of the sheet refilling timings of the respective printing devices 200 is the same as the sheet refilling order and the sheet refilling timings of the respective printing devices 200 are shifted from each other.

Further, in the case of the procedure shown in FIG. 4, the printing control device 100 determines whether or not the order of the sheet refilling timings of the respective printing devices 200 calculated in S22 is the same as the sheet refilling order indicated by the information defining the sheet refilling order. In a case where the order of the sheet refilling timings is the same as the sheet refilling order, the printing control device 100 executes the processing of S24 and subsequent steps. In a case where the orders are not the same, the processing returns to S20 and the assignment pattern is randomly generated again.

Further, in the procedures shown as examples in FIGS. 5 and 10, for example, in S48 and S66, the remaining jobs may be assigned to the respective printing devices 200 such that the order of the sheet refilling timings of the respective printing devices 200 is the same as the above-mentioned refilling order.

Figure 13:
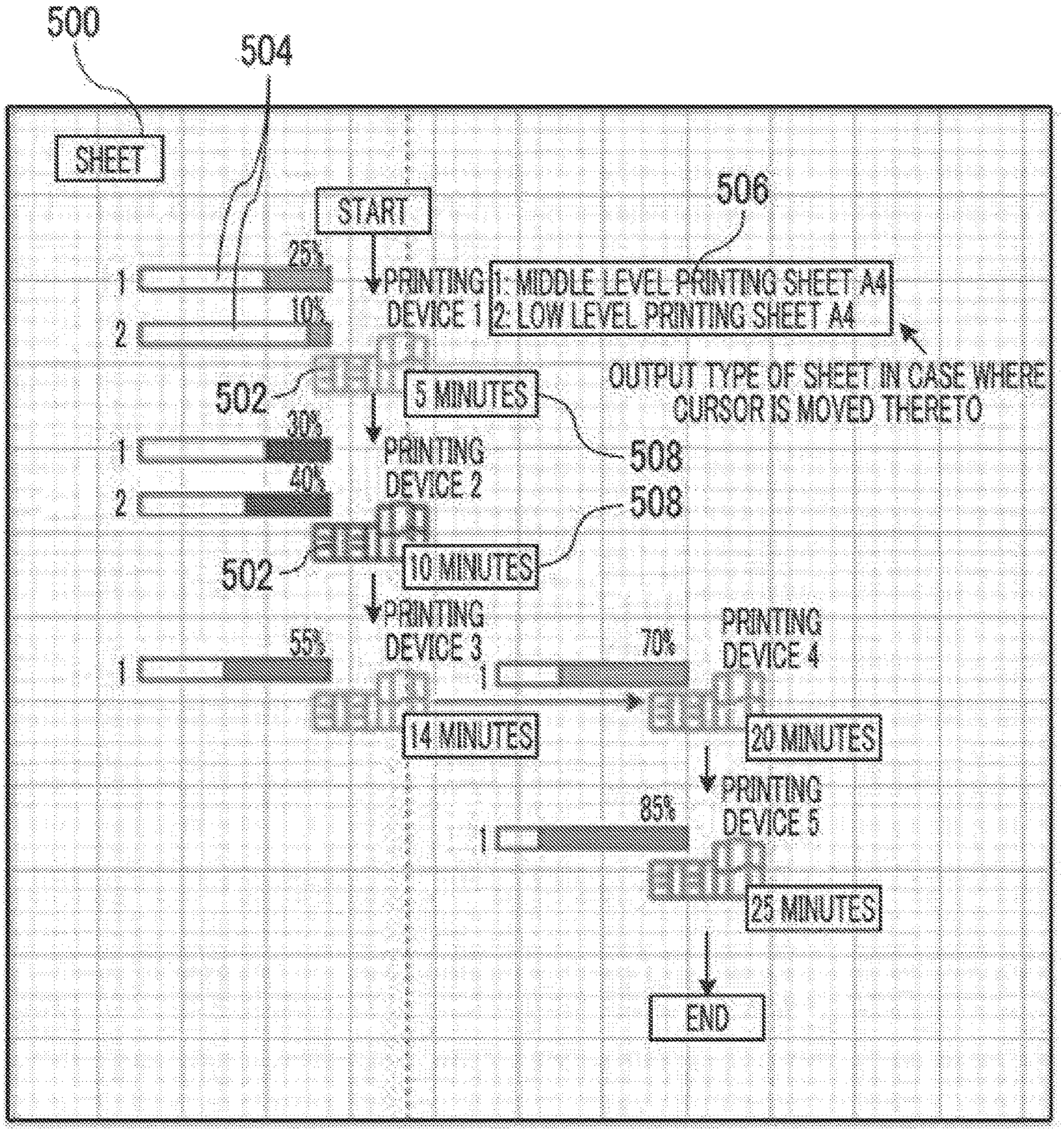
FIG. 13 is a diagram showing an example of a map screen.

Further, in the modification example, the printing control device 100 may display a map indicating a position of each printing device 200 to the user. FIG. 13 shows an example of a map screen which displays the map.

On a map screen 500 shown in FIG. 13, icons 502 (which are images representing shapes of the printing devices) representing the five printing devices 1 to 5 are displayed at positions corresponding to the respective installation positions. In the example, the printing devices 1 to 5 are arranged in the positional relationship shown in the drawing. Therefore, the shortest pathway for reaching each of the printing devices 1 to 5 once for sheet refilling is a pathway for reaching the printing devices 1, 2, 3, 4, and 5 in this order. An arrow between the icons 502 on the map screen 500 indicates a pathway for sheet refilling.

Further, on the map screen 500, one or two remaining sheet amount scales 504 are shown on the left side of the icon 502 of each of the printing devices 1 to 5. The remaining sheet amount scale 504 indicates an amount of remaining sheets in a sheet containing unit, and shows a percentage of the current amount of remaining sheets in a case where the total capacity of the sheet containing unit is 100% as a bar graph. The two remaining sheet amount scales 504 are shown for the printing devices 1 and 2, but indicate that the printing devices 1 and 2 each have two sheet containing units. In a case where the cursor is moved to the icon 502 of the printing device, sheet type information 506 indicating the type of sheet in each sheet containing unit of the printing device is displayed.

Further, on the map screen 500, the remaining time period 508 until occurrence of sheet run-out (that is, the sheet refilling timing) of each of the current printing devices is displayed in association with each icon 502 of the printing devices 1 to 5. The printing control device 100 calculates time periods required for the respective printing devices 1 to 5 to entirely use the amounts of remaining sheets in the current printing devices by the job groups assigned to the current printing devices in the procedures of FIG. 2, FIG. 4, FIG. 5, or FIG. 10, and displays the time periods near the icons 502 of the current printing device as initial values of the remaining time periods 508 until printing is started. Then, at a time point in which the printing control device 100 actually assigns the jobs to the printing devices 1 to 5 and executes printing, the printing control device 100 displays a value, which is obtained by subtracting the elapsed time from the start of printing from the initial value, as the remaining time period 508.

The map screen 500 may be displayed on a display device attached to the printing control device 100, or may be displayed on a screen of a personal computer (PC) of a user accessing the printing control device 100 through a network.

Next, a second modification example will be described. In the above exemplary embodiment, assignment of the jobs in a case where a plurality of jobs are input to the printing control device 100 has been described. On the other hand, the modification example is an example in which a single job with a large amount of used sheets is input to the printing control device 100.

Figure 14:
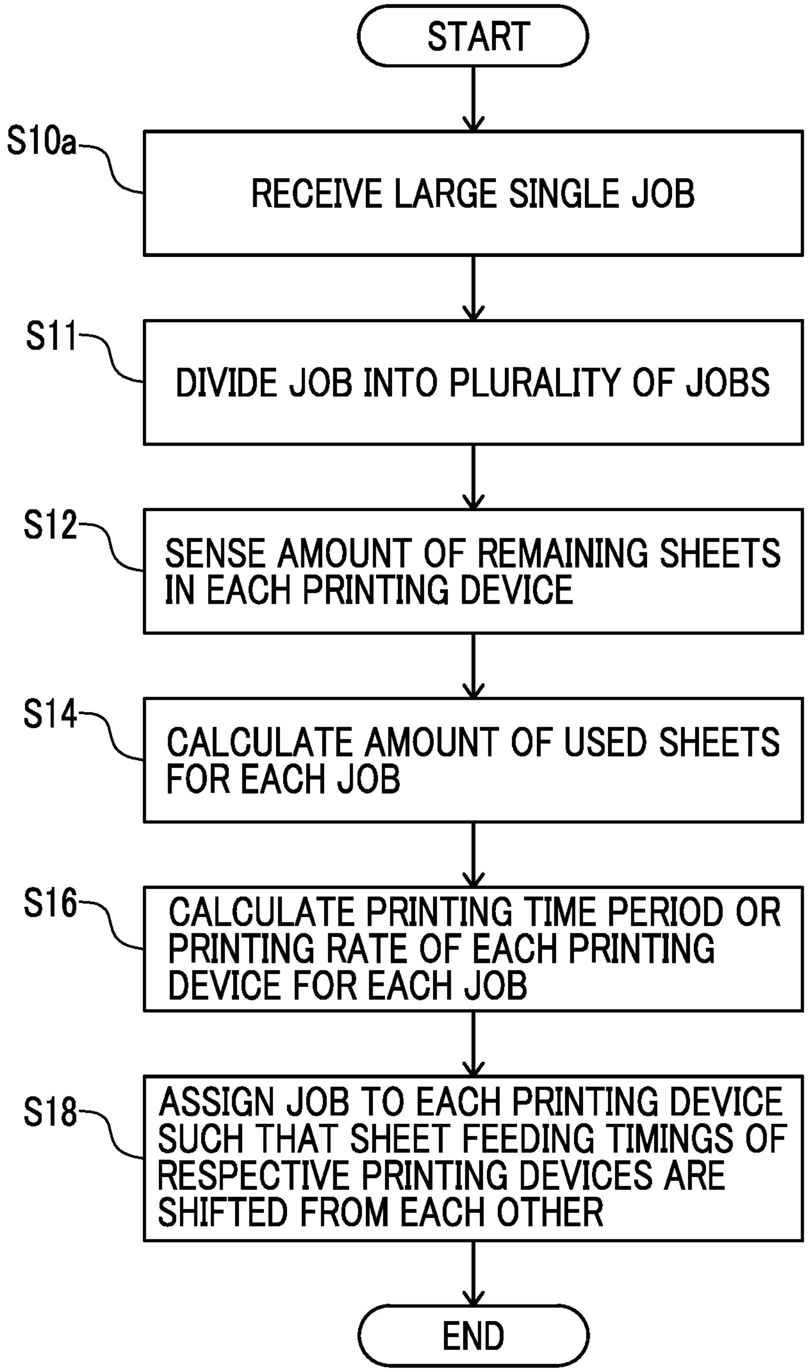
FIG. 14 is a diagram showing an example of a processing procedure of a modification example in which a large job is divided into a plurality of jobs and the jobs are assigned to a plurality of printing devices.

FIG. 14 shows an example of a processing procedure executed by the printing control device 100 in the modification example. The procedure is executed in a case where a single job with a large amount of used sheets is received (S10*a*). For example, in a case where the amount of used sheets for the job is larger than a predetermined threshold value, it may be determined that the job is necessary and is a job with a large amount of used sheets. The threshold value used herein may be a fixed value or may be a value determined on the basis of the amounts of remaining sheets in the plurality of printing devices 200 under the control of the printing control device 100.

Then, the printing control device 100 divides the job received in S10*a* into a plurality of jobs (S11). Here, the job is divided into, for example, a predetermined number of jobs. Alternatively, the job is divided into a plurality of jobs having a predetermined amount of used sheets or less. Further, the job may be divided such that the amount of used sheets is substantially equal, or the job may be divided such that the amount of used sheets varies in accordance with the predetermined pattern.

Thereafter, the printing control device 100 executes the processing of S12 to S18 in the same manner as in the procedure of FIG. 2. As the processing of S18 in the above-mentioned processing, the printing control device 100 may execute the procedures shown in FIG. 4, FIG. 5, or FIG. 10.

The second modification example described above is an example in a case where a single job with a large amount of used sheets is input. However, the same method is also applicable in a case where a job with a large amount of used sheets is included in a plurality of input jobs. In such a case, the printing control device 100 divides a job with a large amount of used sheets among the plurality of input jobs. The printing control device 100 assigns a job group including a job generated by the division and a job not divided to each printing device 200 in accordance with the procedure shown as an example in FIG. 2, FIG. 4, FIG. 5, or FIG. 10.

Figure 15:
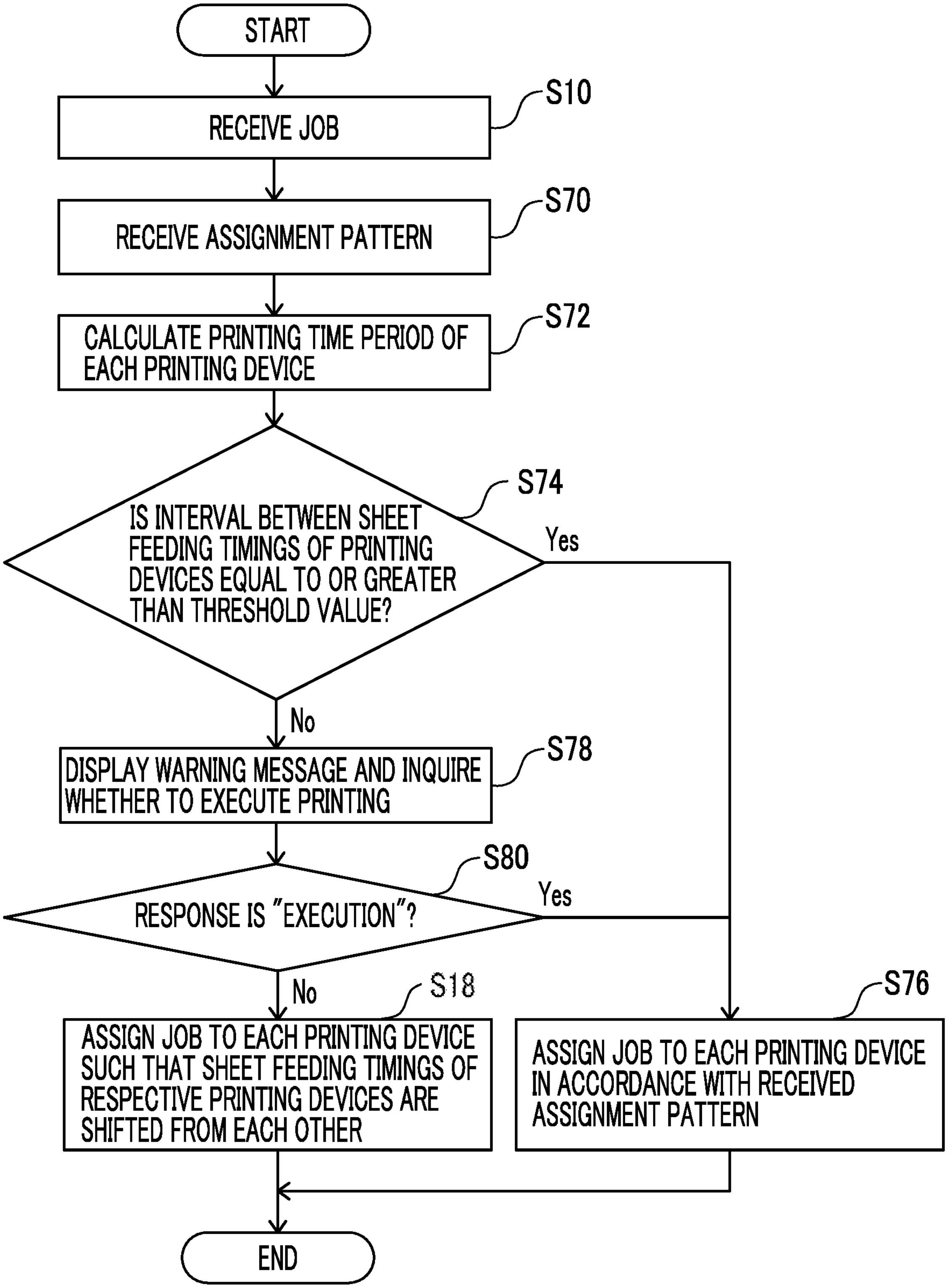
FIG. 15 is a diagram showing an example of a processing procedure of a modification example in which an input of an assignment pattern from a user is received.

Next, a third modification example will be described. FIG. 15 shows an example of a processing procedure executed by the printing control device 100 of the modification example. Among the steps in the procedure of FIG. 15, steps the same as the steps of the procedure of FIG. 2 are designated by the identical reference numerals.

In the procedure of FIG. 15, the printing control device 100 receives the plurality of jobs from the user (S10), and receives input of the assignment pattern for the plurality of jobs to the plurality of printing devices 200 (S70). In S70, for example, the printing control device 100 receives from the user the designation of the printing device 200 as the assignment destination of each job.

Next, the printing control device 100 calculates a printing time period of each printing device 200 in accordance with the assignment pattern received in S70 (S72). The calculation may be performed in the same manner as the processing of S16 in the procedure of FIGS. 2 and S22 of the procedure of FIG. 3. In S72, as the printing time period of each printing device 200, a time period until the sheet run-out of the printing device 200 calculated by the procedure of FIG. 3 occurs may be calculated.

Next, the printing control device 100 determines, using the calculation result of S72, whether or not the intervals between the sheet refilling timings of the respective printing devices 200 in a case of following the assignment pattern received in S70 are equal to or greater than the threshold value (S74). The intervals between the sheet refilling timings of the printing devices 200 are equal to the difference between the printing time periods of the printing devices 200 calculated in S72. Therefore, in S72, it is determined whether or not all the differences between the printing time periods are equal to or greater than the threshold value. In a case where the result of the determination is Yes, the printing control device 100 assigns the job to each printing device 200 in accordance with the assignment pattern received in S70, and causes each printing device 200 to execute printing (S76).

In a case where the determination result in S74 is No, the printing control device 100 displays a warning message, and then inquires to the user whether or not to intactly execute printing with the input assignment pattern (S78). For example, the warning message to be displayed may indicate that the time periods of the sheet refilling operations may overlap in the plurality of printing devices 200.

The printing control device 100 receives the response of the user to the inquiry in S78, and determines whether or not the response is "the printing is intactly executed with the input assignment pattern" (S80). In a case where the determination result in S80 is Yes, the printing control device assigns the job to each printing device 200 in accordance with the assignment pattern and causes printing to be executed (S76).

In a case where the determination result in S80 is No, the printing control device 100 assigns the job to each printing device 200 such that the sheet refilling timings of the plurality of printing devices 200 are shifted from each other on the basis of the printing rate or the printing time period for each job of each printing device 200 obtained in S72 (S18). The processing is the same as the processing of S18 in FIG. 2, and more specifically, the processing may be, for example, the processing shown in FIG. 4, FIG. 5, or FIG. 10.

As described above, in the modification example, in a case where the sheet refilling operations of the plurality of printing devices 200 may overlap with each other in the assignment pattern which is input by the user, the printing control device 100 calculates such assignment patterns that the sheet refilling operations of the printing device 200 do not overlap.

The exemplary embodiments and modification examples of the present invention have been described above. These exemplary embodiments and modification examples are merely exemplary, and various modification examples and improvements can be made within the scope of the present invention.

Figure 16:
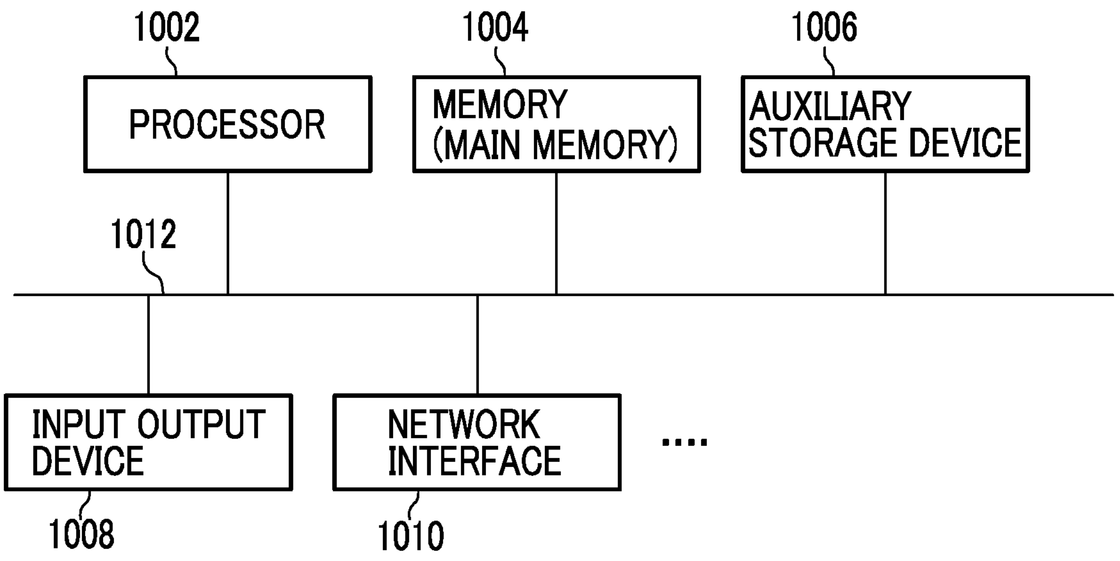
FIG. 16 is a diagram showing an example of a hardware configuration of a computer.

The printing control device 100 in the exemplary embodiment and the modification example described above is configured by using, for example, a general-purpose computer. For example, as shown as an example in FIG. 16, the computer has a circuit configuration in which the following elements are connected via a data transmission path such as a bus 1012. The elements include: a processor 1002; a memory (main memory) 1004 such as a random access memory (RAM); a controller that controls an auxiliary storage device 1006 that is a non-volatile storage device such as a flash memory, a solid state drive (SSD), or a hard disk (HDD); an interface with various input output devices 1008; a network interface 1010 that performs control for connection with a network such as a local area network; and the like. A program describing the content of the processing of the above-mentioned exemplary embodiment is installed in the computer through the network or the like and stored in the auxiliary storage device 1006. The information processing apparatus of the present exemplary embodiment is configured by executing the program which is stored in the auxiliary storage device 1006 by the processor 1002 using the memory 1004.

In the above-mentioned exemplary embodiments, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Supplementary Note (((1)))

An information processing apparatus comprising:

a processor configured to:

execute assignment of jobs to a plurality of printing devices such that sheet refilling timings of the plurality of printing devices are shifted from each other.

(((2)))

The information processing apparatus according to (((1))), wherein the processor is configured to:

execute the assignment of the jobs such that an interval between the sheet refilling timings of the plurality of printing devices is equal to or greater than a threshold value.

(((3)))

The information processing apparatus according to (((1))), wherein the processor is configured to:

obtain an assignment pattern in which the sheet refilling timings of the plurality of printing devices are shifted from each other, among the assignment patterns of the jobs for the plurality of printing devices, on the basis of an amount of remaining sheets of each of the plurality of printing devices and a sheet consumption rate for each job, and execute the assignment of the jobs to the plurality of printing devices in accordance with the obtained assignment pattern.

(((4)))

The information processing apparatus according to any one of (((1))) to (((3))), wherein the processor is configured to:

execute first selection processing of selecting a job to be assigned to a current printing device in accordance with a predetermined assignment policy within a range in which an amount of remaining sheets of the current printing device does not reach 0, for each of the plurality of printing devices; and select jobs to be respectively assigned to the plurality of printing devices among jobs remaining without being assigned to any of the plurality of printing devices after the first selection processing such that the sheet refilling timings of the plurality of printing devices are shifted from each other.

(((5)))

The information processing apparatus according to any one of (((1))) to (((4))), wherein the processor is configured to:

acquire information that defines a sheet refilling order of the plurality of printing devices; and execute the assignment of the jobs to the plurality of printing devices such that the sheet refilling timing of each of the printing devices arrives at a corresponding position in the sheet refilling order.

(((6)))

The information processing apparatus according to any one of (((1))) to (((5))), wherein the processor is configured to:

execute display processing for displaying, on a display device, remaining time periods until the respective sheet refilling timings of the plurality of printing devices at a time point at which printing is executed on the plurality of printing devices or amounts of remaining sheets in the printing devices at the time point.

(((7)))

The information processing apparatus according to (((6))), wherein the display processing is executed at a time point at which printing is executed while the jobs are assigned to the plurality of printing devices.

(((8)))

The information processing apparatus according to (((6))), wherein in the display processing, the remaining time periods or the amounts of remaining sheets in the plurality of printing devices are respectively displayed in association with the plurality of printing devices on a map showing arrangement of the plurality of printing devices.

(((9)))

The information processing apparatus according to any one of (((1))) to (((8))), wherein the processor is configured to:

divide one job into a plurality of jobs; and set the divided plurality of jobs as a target and execute assignment of the jobs such that the sheet refilling timings of the plurality of printing devices are shifted from each other.

(((10)))

The information processing apparatus according to any one of (((1))) to (((9))), wherein the processor is configured to:

receive an input of an assignment pattern of the jobs to the plurality of printing devices from a user; and execute assignment of the jobs to the plurality of printing devices in accordance with the assignment pattern, in a case where the sheet refilling timings of the plurality of printing devices are shifted from each other by the received assignment pattern.

(((11)))

A program causing a computer to execute processing comprising:

executing assignment of jobs to a plurality of printing devices such that sheet refilling timings of the plurality of printing devices are shifted from each other.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:

a processor configured to:

receive a plurality of jobs;

sense a current amount of remaining sheets of each of a plurality of printing devices;

calculate an amount of used sheets for each of the plurality of jobs;

calculate a printing time period or a printing rate to perform printing of each of the plurality of jobs with respect to each of the plurality of printing devices; and execute assignment of the plurality of jobs to the plurality of printing devices such that sheet refilling timings of the plurality of printing devices do not overlap each other on the basis of the printing time period or the printing rate for each of the plurality of jobs with respect to the plurality of printing devices, wherein the assignment of the plurality of jobs comprises generating assignment patterns of jobs and comparing an interval between the sheet refilling timings indicated by the assignment patterns and a threshold value.

2. The information processing apparatus according to claim 1, wherein the processor is configured to:

execute the assignment of the plurality of jobs such that the interval between the sheet refilling timings of the plurality of printing devices is equal to or greater than the threshold value.

3. The information processing apparatus according to claim 1, wherein the processor is configured to:

obtain an assignment pattern in which the sheet refilling timings of the plurality of printing devices do not overlap each other, among the assignment patterns of the plurality of jobs for the plurality of printing devices, on the basis of an amount of remaining sheets of each of the plurality of printing devices and a sheet consumption rate for each job, and execute the assignment of the plurality of jobs to the plurality of printing devices in accordance with the obtained assignment pattern.

4. The information processing apparatus according to claim 1, wherein the processor is configured to:

execute first selection processing of selecting a job to be assigned to a current printing device in accordance with a predetermined assignment policy within a range in which an amount of remaining sheets of the current printing device does not reach 0, for each of the plurality of printing devices; and select jobs to be respectively assigned to the plurality of printing devices among jobs remaining without being assigned to any of the plurality of printing devices after the first selection processing such that the sheet refilling timings of the plurality of printing do not overlap each other.

5. The information processing apparatus according to claim 1, wherein the processor is configured to:

acquire information that defines a sheet refilling order of the plurality of printing devices; and execute the assignment of the plurality of jobs to the plurality of printing devices such that the sheet refilling timing of each of the printing devices arrives at a corresponding position in the sheet refilling order.

6. The information processing apparatus according to claim 1, wherein the processor is configured to:

execute display processing for displaying, on a display device, remaining time periods until the respective sheet refilling timings of the plurality of printing devices at a time point at which printing is executed on the plurality of printing devices or amounts of remaining sheets in the printing devices at the time point.

7. The information processing apparatus according to claim 6, wherein the display processing is executed at a time point at which printing is executed while the plurality of jobs are assigned to the plurality of printing devices.

8. The information processing apparatus according to claim 6, wherein in the display processing, the remaining time periods or the amounts of remaining sheets in the plurality of printing devices are respectively displayed in association with the plurality of printing devices on a map showing arrangement of the plurality of printing devices.

9. The information processing apparatus according to claim 1, wherein the processor is further configured to:

divide one job into the plurality of jobs.

10. The information processing apparatus according to claim 1, wherein the processor is configured to:

receive an input of an assignment pattern of the plurality of jobs to the plurality of printing devices from a user; and execute assignment of the plurality of jobs to the plurality of printing devices in accordance with the assignment pattern, in a case where the sheet refilling timings of the plurality of printing devices do not overlap each other by the received assignment pattern.

11. A non-transitory computer readable medium storing a program for causing a computer to execute processing comprising:

receiving a plurality of jobs;

sensing a current amount of remaining sheets of each of a plurality of printing devices;

calculating an amount of used sheets for each of the plurality of jobs;

calculating a printing time period or a printing rate to perform printing of each of the plurality of jobs with respect to each of the plurality of printing devices; and executing assignment of the plurality of jobs to the plurality of printing devices such that sheet refilling timings of the plurality of printing devices do not overlap each other on the basis of the printing time period or the printing rate for each of the plurality of jobs with respect to the plurality of printing devices, wherein the assignment of the plurality of jobs comprises generating assignment patterns of jobs and comparing an interval between the sheet refilling timings indicated by the assignment patterns and a threshold value.

12. An information processing method comprising:

receiving a plurality of jobs;

sensing a current amount of remaining sheets of each of a plurality of printing devices;

calculating an amount of used sheets for each of the plurality of jobs;

calculating a printing time period or a printing rate to perform printing of each of the plurality of jobs with respect to each of the plurality of printing devices; and executing assignment of the plurality of jobs to the plurality of printing devices such that sheet refilling timings of the plurality of printing devices do not overlap each other on the basis of the printing time period or the printing rate for each of the plurality of jobs with respect to the plurality of printing devices, wherein the assignment of the plurality of jobs comprises generating assignment patterns of jobs and comparing an interval between the sheet refilling timings indicated by the assignment patterns and a threshold value.

* * * * *